United States Patent
Takeda et al.

(10) Patent No.: US 10,752,503 B2
(45) Date of Patent: Aug. 25, 2020

(54) SPHERICAL BORON NITRIDE FINE POWDER, METHOD FOR MANUFACTURING SAME AND THERMALLY CONDUCTIVE RESIN COMPOSITION USING SAME

(71) Applicant: DENKA COMPANY LIMITED, Tokyo (JP)

(72) Inventors: Go Takeda, Omuta (JP); Yoshitaka Taniguchi, Omuta (JP); Takemi Oguma, Machida (JP)

(73) Assignee: DENKA COMPANY LIMITED, Tokyo (JP)

( * ) Notice: Subject to any disclaimer, the term of this patent is extended or adjusted under 35 U.S.C. 154(b) by 0 days.

(21) Appl. No.: 16/343,574

(22) PCT Filed: Aug. 31, 2017

(86) PCT No.: PCT/JP2017/031352
§ 371 (c)(1),
(2) Date: Apr. 19, 2019

(87) PCT Pub. No.: WO2018/074077
PCT Pub. Date: Apr. 26, 2018

(65) Prior Publication Data
US 2020/0048091 A1    Feb. 13, 2020

(30) Foreign Application Priority Data

Oct. 21, 2016 (JP) .................................. 2016-207061

(51) Int. Cl.
| C01B 21/064 | (2006.01) |
| C08K 3/38 | (2006.01) |
| C08K 9/04 | (2006.01) |
| C08L 101/00 | (2006.01) |
| C08K 3/013 | (2018.01) |

(52) U.S. Cl.
CPC .............. *C01B 21/064* (2013.01); *C08K 3/38* (2013.01); *C08K 9/04* (2013.01); *C08L 101/00* (2013.01); *C01P 2004/32* (2013.01); *C01P 2004/62* (2013.01); *C01P 2004/64* (2013.01); *C08K 3/013* (2018.01); *C08K 2003/385* (2013.01); *C08L 2203/20* (2013.01)

(58) Field of Classification Search
None
See application file for complete search history.

(56) References Cited

U.S. PATENT DOCUMENTS

| 6,096,671 | A | 8/2000 | Kawasaki et al. |
| 6,348,179 | B1 | 2/2002 | Paine et al. |
| 6,652,822 | B2 * | 11/2003 | Phillips ................. C01B 21/064 23/293 R |
| 9,334,391 | B2 | 5/2016 | Koshida et al. |
| 2016/0340191 | A1 | 11/2016 | Ikemiya et al. |
| 2018/0230012 | A1 | 8/2018 | Kurokawa et al. |

FOREIGN PATENT DOCUMENTS

| JP | H09-202663 A | 8/1997 |
| JP | 2000-327312 A | 11/2000 |
| JP | 2004-182572 A | 7/2004 |
| JP | 2014-40341 A | 3/2014 |
| JP | 2014166930 A * | 9/2014 |
| JP | 2015-36361 A | 2/2015 |
| JP | 2015-196632 A | 11/2015 |
| WO | 2012/027194 A2 | 3/2012 |
| WO | 2014/003193 A1 | 1/2014 |
| WO | 2015/119198 A1 | 8/2015 |
| WO | 2015/122379 A1 | 8/2015 |
| WO | 2016/092951 A1 | 6/2016 |
| WO | 2016/092952 A1 | 6/2016 |

OTHER PUBLICATIONS

PCT/ISA/210, "International Search Report for International Application No. PCT/JP2017/031352," dated Oct. 17, 2017.
Europe Patent Office, "Search Report for European Patent Application No. 17863255.0," dated Apr. 1, 2020.

* cited by examiner

*Primary Examiner* — Guinever S Gregorio
(74) *Attorney, Agent, or Firm* — Manabu Kanesaka

(57) ABSTRACT

The present invention provides a spherical boron nitride fine powder and the other superior in filling property into resin. The present invention relates to a spherical boron nitride fine powder having the following characteristics (A) to (C):

(A) the spherical boron nitride fine particles have any one or more of Si, Ti, Zr, Ce, Al, Mg, Ge, Ga, and V in an amount of 0.1 atm % or more and 3.0 atm % or less in its composition on the surface of 10 nm;

(B) the spherical boron nitride fine powder has an average particle diameter of 0.05 μm or more and 1 μm or less; and (C) the spherical boron nitride fine powder has an average circularity of 0.8 or more.

9 Claims, No Drawings

SPHERICAL BORON NITRIDE FINE POWDER, METHOD FOR MANUFACTURING SAME AND THERMALLY CONDUCTIVE RESIN COMPOSITION USING SAME

RELATED APPLICATIONS

The present application is National Phase of International Application No. PCT/JP2017/031352 filed Aug. 31, 2017, and claims priority from Japanese Application No. 2016-207061, filed Oct. 21, 2016, the disclosure of which is hereby incorporated by reference herein in its entirety.

TECHNICAL FIELD

The present invention relates to a spherical boron nitride fine powder, a method for manufacturing the same and a thermally conductive resin composition using the same.

BACKGROUND ART

Recently, there exists a need for reduction in size of electronic parts and thus for reduction in thickness of the parts used therein such as heat dissipation sheets.

Heat-dissipating fillers used in these electronic parts often contain both coarse powder of several μm to dozens of μm and fine powder of submicron to several μm and the fine powder has an important role in reducing the interfacial thermal resistance.

The particle shape of the heat-dissipating filler, especially of fine-powder heat-dissipating filler, is desirably spherical and spherical alumina fine powders have been mainly used traditionally. There is no example of a spherical boron nitride fine powder being used as the heat-dissipating filler.

Boron nitride is generally prepared by reacting a boron source (such as boric acid or borax) with a nitrogen source (such as urea, melamine, or ammonia) at high temperature, and known are, for example, a "pine cone"-shaped boron nitride, i.e., aggregation of scaly primary particles from boric acid and melamine, (Patent Document 1) and a spherical boron nitride prepared by spray-drying method (Patent Document 2).

Meanwhile, there are reports of spherical boron nitride fine powders being prepared by gas-phase synthesis method (Patent Documents 3, 4, and 5).

In the case of scaly boron nitride, there is a report on improvement in filling property by surface treatment in Patent Document 6 and Patent Document 6 discloses a method for producing a modified boron nitride comprising a step of mechanochemically treating scaly boron nitride in the presence of water or an organic solvent.

CITATION LIST

Patent Documents

Patent Document 1: JP-A No. H09-202663
Patent Document 2: JP-A No. 2014-40341
Patent Document 3: JP-A No. 2000-327312
Patent Document 4: JP-A No. 2004-182572
Patent Document 5: WO No. 2015/122379
Patent Document 6: JP-A No. 2015-36361

SUMMARY OF THE INVENTION

Technical Problem

Boron nitride prepared by a method such as Patent Document 1 or 2, which has an aggregate particle diameter of dozens of μm or more, consists of large particles and thus it has been difficult by such a method to prepare extremely small and spherical boron nitride fine powder, as in the present invention.

Spherical boron nitride fine powders described in Patent Documents 3 to 5 were not hitherto used as a thermally conductive filler. It is because boron nitride prepared by a conventional gas-phase synthesis method has a smaller number of surface functional groups compared to oxide fillers and thus a lower filling property compared to oxide fillers.

In the case of the modified boron nitride fine powder described in Patent Document 6, there was only small improvement in filling property by surface treatment of the scaly boron nitride and there was observed no improvement in filling property into thermally conductive resin compositions.

Accordingly, the main object of the present invention is to provide a spherical boron nitride fine powder superior in filling property, a method for manufacturing the same and a thermally conductive resin composition using the same.

Solution to Problem

As spherical boron nitride fine powder does not have or has only a limited number of faces in the thickness direction, where common scaly boron nitrides have more functional groups, on the surface, it was difficult to improve the filling property of the powder and provide the powder with favorable effects, even if a conventional surface treatment method was employed. In addition, spherical boron nitride fine powders which generally have a smaller number of surface functional groups, are considered to be less effectively improved by coupling treatment.

Thus, the inventors have made intensive studies for improvement in filling property of the spherical boron nitride fine powder.

As a result, the inventors have found that it was possible to prepare a spherical fine powder having organic functional groups present on the surface of the spherical particles by providing a particular surface modification treatment on the particle surface of a spherical boron nitride fine powder having a particular average particle diameter and shape before reaction with a metal coupling agent. It was also found that the spherical boron nitride fine powder having such organic functional groups has a filling property far better than conventional products.

It was also found in the present invention that it was possible to make the spherical boron nitride fine powder exhibit the effects of coupling treatment by providing a particular modification treatment on the particle surface of the spherical boron nitride fine powder.

In this way, the inventors have made the present invention. Specifically, the present invention may provide the followings [1] to [7].

The present invention may provide the followings:

[1] A spherical boron nitride fine powder, having the following characteristics (A) to (C):

(A) the spherical boron nitride fine particles have any one or more of Si, Ti, Zr, Ce, Al, Mg, Ge, Ga, and V in an amount of 0.1 atm % or more and 3.0 atm % or less in its composition on the surface of 10 nm;

(B) the spherical boron nitride fine powder has an average particle diameter of 0.05 μm or more and 1 μm or less; and (C) the spherical boron nitride fine powder has an average circularity of 0.8 or more.

[2] The spherical boron nitride fine powder according to the present invention may have additionally the following characteristic:
(D) the spherical boron nitride fine particles may have an organic functional group on the surface.
[3] In the spherical boron nitride fine powder according to the present invention, the organic functional group present on the surface of the spherical boron nitride fine particles may be one or more selected from epoxy groups that may be substituted, styryl groups that may be substituted, alkyl groups that may be substituted, vinyl groups that may be substituted, acetylacetate groups that may be substituted, acyl groups that may be substituted, isocyanate groups that may be substituted, cyclohexyl groups that may be substituted, and tetraoctyl bis groups that may be substituted.
[4] The spherical boron nitride fine powder according to the present invention may be prepared by mixing the raw material, spherical boron nitride fine powder having an average particle diameter of 0.05 μm or more and 1 μm or less and an average circularity of 0.8 or more with an oxidizer, allowing surface modification treatment of the particles by wet pulverization or wet crushing of the mixture and allowing additional reaction of the surface-modified powder with a metal coupling agent.
[5] In preparing the spherical boron nitride fine powder according to the present invention, an oxidizer and a water-soluble solvent may be added during the surface modification treatment.
[6] In preparing the spherical boron nitride fine powder according to the present invention, the metal coupling agent used may be one or more selected from metal alkoxides having organic functional groups, metal chelates having organic functional groups, and metal halogen compounds having organic functional groups.

The present invention may also provide the following:
[7] A thermally conductive resin composition, comprising the spherical boron nitride fine powder described in any one of [1] to [6] above.

Advantageous Effects of Invention

The present invention may provide a spherical boron nitride fine powder superior in filling property. The advantageous effects are not limited to and may be any of those described herein.

DESCRIPTION OF EMBODIMENTS

Hereinafter, favorable embodiments of the present invention will be described. The embodiments described below are only examples of the typical embodiments of the present invention and it should be understood that the scope of the present invention shall not be restricted thereby.

<1. Spherical Boron Nitride Fine Powder of the Present Invention>

The present invention relates to a spherical boron nitride fine powder having the following characteristics (A) to (C) described below. The spherical boron nitride fine powder of the present invention desirably has additionally the following characteristic:
(D) it has organic functional groups on the surface of the spherical boron nitride fine particles.
(A) the spherical boron nitride fine particles have any one or more of Si, Ti, Zr, Ce, Al, Mg, Ge, Ga, and V in an amount of 0.1 atm % or more and 3.0 atm % or less in its composition on the surface of 10 nm;
(B) the spherical boron nitride fine powder has an average particle diameter of 0.05 μm or more and 1 μm or less; and
(C) the spherical boron nitride fine powder has an average circularity of 0.8 or more.

In the "spherical boron nitride fine powder" according to the present invention, the spherical boron nitride fine particles after surface treatment preferably have any one or more metal elements of Si, Ti, Zr, Ce, Al, Mg, Ge, Ga, and V in an amount of 0.1 atm % or more and 3.0 atm % or less, as determined by X-Ray photoelectron spectroscopy analysis, in its composition on the surface of 10 nm.

In particular, one or more selected from Si, Ti, Zr, and Al are favorable from the point of availability of the metal coupling agents.

When the spherical boron nitride fine particles after surface treatment have metal elements in an amount of less than 0.1 atm % in its composition on the surface of 10 nm, there may be insufficient improving effect in filling property, and thermal conductivity may decline when it is used as filler, if the metal element content is more than 3.0 atm %.

In the case of the "spherical boron nitride fine powder" according to the present invention, the spherical boron nitride fine powder after surface treatment preferably has an average particle diameter of 0.05 to 1.0 μm, more preferably 0.1 to 1.0 μm.

When the average particle diameter of fine powder is less than 0.05 μm, the spherical boron nitride fine powder may lead to increase in viscosity when mixed with a resin even after surface treatment, while an average particle diameter of more than 1.0 μm is unfavorable, as the yield may drop significantly during gas phase synthesis.

In the case of the "spherical boron nitride fine powder" according to the present invention, the average circularity of the spherical boron nitride fine powder after surface treatment is preferably 0.8 or more, more preferably 0.9 or more, for improvement in filling property and for reduction of the influence by orientation.

In the case of the "spherical boron nitride fine powder" according to the present invention, the spherical boron nitride after surface treatment desirably has organic functional groups on the surface of the fine particles. The organic functional groups are not particularly limited. For example in the surface treatment method of the present invention, metal elements and organic functional groups of a commercial metal coupling agent may be used, as needed, for modification of the fine particle surface. An organic functional group that is compatible with the resin used in the thermally conductive resin composition, with which it is mixed, may be chosen as the organic functional group.

Examples of the organic functional groups present on the surface of the "spherical boron nitride fine particles" include epoxy groups that may be substituted, styryl groups that may be substituted, alkyl groups that may be substituted, vinyl groups that may be substituted, acetylacetate groups that may be substituted, acyl groups that may be substituted, isocyanate groups that may be substituted, cyclohexyl groups that may be substituted, and tetraoctyl bis groups that may be substituted. These groups may be substituted or non-substituted organic functional groups. One or more of these groups may be selected.

The epoxy group that may be substituted is, for example, an epoxy group.

The aryl group that may be substituted is, for example, a styryl group.

Examples of the alkyl groups that may be substituted include propyl groups that may be substituted (for example, methacryloxypropyl group, acryloxypropyl group, aminoethylaminopropyl group, glycidoxypropyl group, phenylaminopropyl group), and alkyl groups having a straight-chain carbon number of 5 or more (favorably, straight-chain carbon number of 5 to 25).

The vinyl group that may be substituted is, for example, a vinyl group, a styryl group, an acetylacetonate group, or a methacryloyl group.

The acetylacetonate group that may be substituted is, for example, an acetylacetonate group.

The acyl group that may be substituted is, for example, an acetylacetonate group, an isopropyl triisostearoyl group, a methacryl group, or a methacryloyl group.

The isocyanate group is, for example, an isocyanate group.

The cyclohexyl group that may be substituted is, for example, a cyclohexyl group.

The tetraoctyl bis(ditridecylphosphite) group that may be substituted is, for example, a tetraoctyl bis(ditridecylphosphite) group.

The organic functional group may be one or more selected from these groups.

Examples of the organic functional groups present on the surface of the "spherical boron nitride fine particles" include epoxy groups, styryl groups, a methacryloxypropyl group, an acryloxypropyl group, an aminoethylaminopropyl group, glycidoxypropyl group, a phenylaminopropyl group, an acetylacetonate group, vinyl groups, methacryl groups, methacryloyl groups, an isopropyltriisostearoyl group, a tetraoctyl bis(ditridecyl phosphite) group, a cyclohexyl group, an isocyanate group, and alkyl groups having a straight-chain carbon number of 5 or more. The organic functional group may be one or more selected from these groups.

Among the groups above, an epoxy group, a styryl group, a glycidoxypropyl group, an acetylacetonate group, a vinyl group, isopropyltriisostearoyl group, a tetraoctyl bis(ditridecyl phosphite) group, a cyclohexyl group, or an isocyanate group is more favorable. The organic functional group may be one or more selected from these groups.

<2. Method for Manufacturing a Surface-Treated Spherical Boron Nitride Fine Powder of the Present Invention>

The manufacturing method according to the present invention is a method of preparing a surface-treated spherical boron nitride fine powder by adding an oxidizer to the raw material, spherical boron nitride fine powder having an average particle diameter of 0.05 μm or more and 1 μm or less and an average circularity of 0.8 or more (first spherical boron nitride fine powder), allowing surface modification treatment of the particle by wet pulverization or wet crushing of the mixture, and allowing additional reaction of the resulting mixture with a metal coupling agent.

<Method for Manufacturing a Non-Surface-Treated Spherical Boron Nitride Fine Powder in the Manufacturing Method According to the Present Invention>

The non-surface-treated spherical boron nitride fine powder that is used as the raw material in the manufacturing method according to the present invention can be prepared, not by a conventional solid-phase method for production of hexagonal boron nitride, but by a so-called gas phase synthesis of using an vaporized boric acid alkoxide and ammonia as raw materials in a tubular furnace under inert gas flow (first calcination condition), then calcining the product in a resistance-heating furnace (second calcination condition), and finally, calcining the calcined product in a boron nitride crucible placed in an induction-heating furnace and thus giving a boron nitride fine powder (third calcination condition).

In this way, it is possible to prepare a spherical boron nitride fine powder having an average particle diameter 0.05 μm or more and 1 μm or less and an average circularity of 0.8 or more (the first spherical boron nitride fine powder).

The spherical boron nitride fine powder used as the raw material can be prepared with reference to Patent Document 5 (WO No. 2015/122379).

For use for the present purpose, the spherical boron nitride fine powder is desirably higher in purity and crystallinity, and it is preferable to calcine the powder at 1,800 to 2,200° C. under a nitrogen environment under the third calcination condition.

It is possible to obtain the first calcined powder (boron nitride white powder) by carrying out a so-called gas phase synthesis using a vaporized boric acid alkoxide and ammonia gas as raw materials in a tubular furnace (furnace temperature: 750 to 1,100° C.) in inert gas flow under the first calcination condition. It is possible in this way to control the average particle diameter of the boron nitride particles in a particular range.

The kind of the inert gas flow is, for example, a nitrogen gas or a rare gas (such as neon or argon).

The first calcination condition is preferably 750 to 1,100° C.

The reaction time between the boric acid alkoxide and ammonia is preferably 30 seconds or less to make the average particle diameter of the raw material boron nitride powder controlled in a particular range.

The boric acid alkoxide is not particularly limited, and the "alkyl groups (R)" in the "alkoxide (RO—)" may be the same as or different from each other, but are preferably straight-chain or branched-chain alkyls having 1 to 5 carbon atoms. Examples of the boric acid alkoxides include trimethyl borate, triethyl borate, and triisopropyl borate. Among the compounds above, trimethyl borate is preferable from the points of reactivity with ammonia and availability.

The molar ratio of boric acid alkoxide: ammonia is preferably 1:1 to 10, more preferably 1:1 to 2, to make the average particle diameter of the raw material, boron nitride powder adjusted in a particular range.

Calcination of the first calcined powder in a resistance-heating furnace in the atmosphere under the second calcination condition, gives the second calcined product after cooling. It is thus possible to make the average circularity of the raw material, boron nitride powder controlled in a particular range.

The temperature of the second calcination condition is preferably 1,000 to 1,600° C., more preferably 1,200 to 1,500° C.

The reaction time under the second calcination condition is preferably 1 hour or more, more preferably 1 to 20 hours, even more preferably 1 to 10 hours.

The atmosphere under the second calcination condition is, for example, an ammonia gas or mixture of an ammonia gas and an inert gas. The atmosphere is preferably a mixed atmosphere of an ammonia gas and a nitrogen gas (favorably, ammonia 50 to 90 vol %: nitrogen 10 to 50 vol %).

Calcination of the second calcined product in an induction heating furnace in the nitrogen environment under the third calcination condition gives a boron nitride fine powder for use as the raw material in the present invention. The temperature under the third calcination condition is preferably 1,000 to 3,000° C., more preferably 1,500 to 2,500° C., even more preferably 1,800 to 2,200° C.

The period under the third calcination condition is preferably 0.5 hour or more, more preferably 0.5 to 20 hours, even more preferably 1 to 10 hours.

<Method of Surface-Treating Raw Material Fine Particles in the Manufacturing Method of the Present Invention>

In the "method of surface-treating particles" in the manufacturing method according to the present invention, it is desirable to carry out surface modification treatment of the particles by adding an oxidizer to the raw material, spherical boron nitride fine powder having a particular average particle diameter and shape (first spherical boron nitride fine powder) and wet-pulverizing or wet-crushing the mixture.

It is thus possible to obtain a surface-modified spherical boron nitride fine powder that is reactive with a metal coupling agent (second spherical boron nitride fine powder: also referred to as "surface-modified spherical boron nitride fine powder").

The spherical boron nitride fine powder obtained under the first to third calcination conditions (first spherical boron nitride fine powder) may be used as the raw material in the manufacturing method according to the present invention and subjected to the following surface treatment method.

The raw material, spherical boron nitride fine powder preferably has an average particle diameter of 0.05 µm or more and 1 µm or less and an average circularity of 0.8 or more. The average circularity is 1.0 at most.

The spherical boron nitride prepared by gas phase synthesis is a fine powder of 1.0 µm or less that has an onion-like structure that is covered with the 002 faces of boron nitride and is thus almost spherical.

As the spherical boron nitride fine powder do not have or have only a limited number of faces in the thickness direction, on which common scaly boron nitrides have more functional groups, on the surface, it was difficult to improve the filling property of the boron nitride fine powder and provide it with sufficiently favorable effects by conventional surface treatment methods.

However, after intensive studies, the inventors have found that it is possible, by adding an oxidizer using a pulverizer or a crusher and performing surface modification treatment of the particle surface, as it is wet, before the coupling treatment, to make the favorable effects of coupling treatment expressed, even with a spherical boron nitride fine powder generally having a smaller number of surface functional groups and thus not showing the effects of coupling treatment.

Any known wet-type pulverizer or crusher may be used in the wet pulverization and wet crushing used in the present invention.

Examples of the pulverizers and crushers include, but are not particularly limited to, the rocking mills used in the present invention, bead mills, ball mills, Henschel Mixers, jet mills, star-burst mixers, and paint conditioners, if wet surface modification is possible therein.

Examples of the media include zirconia balls and silicon nitrides and the medium is desirably used, as needed.

The period of the pulverization or crushing treatment is preferably 10 minutes or more and 5 hours or less, more preferably 20 minutes or more and 2 hours or less. A treatment period of less than 10 minutes often results in insufficient surface modification efficiency by pulverization or crushing and a treatment period of more than 5 hours is unfavorable from the point of low productivity.

The frequency of the mill during the pulverization or crushing is preferably 200 to 2,000 rpm, more preferably 500 to 1,500 rpm.

The oxidizer used is not particularly limited, and examples thereof include hydrogen peroxides, nitric acids, and permanganic acid salts. Among the oxidizers above, those soluble in solvent and easily removable after treatment are desirable. More desirable are hydrogen peroxides, compounds that have an oxidative force not lower than hydrogen peroxide and are soluble in solvent and easily removable after treatment (e.g., nitric acids) and the like. These oxidizers may be used alone or in combination of two or more. Only water is desirably used as the solvent, depending on the oxidizer selected.

Combined use of the pulverization-crushing treatment and an oxidizer results in more efficiently surface modification, improvement in dispersibility, increase in the number of surface functional groups and efficient progress of the coupling reaction.

The amount of the oxidizer used is preferably 30 to 200 parts, more preferably 50 to 150 parts, with respect to 100 parts of boron nitride.

The solvent to be mixed with the oxidizer is preferably a water-soluble solvent. The water-soluble solvents are, for example, one or more solvents selected from water, alcohols, and dioxanes. Use of water and/or an alcohol is preferable. The alcohol is preferably an alcohol having a straight-chain or branched-chain alkyl group, and those having an alkyl group of 1 to 3 carbon atoms (e.g., methanol, ethanol, propyl alcohol, isopropyl alcohol) are preferable. More preferable are water, an alcohol having 1 to 3 carbon atoms, and the mixture thereof.

The blending ratio of the oxidizer to the solvent is preferably 1 to 10 parts, more preferably 2 to 7 parts, with respect to 100 parts of the solvent.

<Surface Treatment Methods of Adding Organic Functional Groups in the Manufacturing Method of the Present Invention>

In the "surface treatment method of adding organic functional groups" in the manufacturing method according to the present invention, a metal coupling agent having organic functional groups is allowed to react with the spherical boron nitride fine powder treated with the special surface modification treatment (surface-modified spherical boron nitride fine powder).

It is thus possible to prepare a spherical boron nitride fine powder having a metal element and organic functional groups present on the surface of the spherical boron nitride fine particles (third spherical boron nitride fine powder: hereinafter, also referred to as "surface-treated spherical boron nitride fine powder").

In the surface treatment method of treating the surface-modified spherical boron nitride fine particles with a metal element and organic functional groups according to the present invention, it is preferable to use a spherical boron nitride fine powder having an average particle diameter of 0.05 µm or more and 1.0 µm or less and an average circularity of 0.8 or more as a raw material, conduct surface modification treatment of the powder with an oxidizer added thereto by wet pulverization or wet crushing, and then allow a reaction of the resulting powder with a metal coupling agent.

It is preferable to sieve the boron nitride fine powder after powder surface modification treatment and filter and wash the sieved slurry. The washing liquid is not particularly limited and, for example, a solvent that is miscible with oxidizer may be used.

The temperature of the coupling reaction condition is preferably 10 to 70° C., more preferably 20 to 70° C.

The period of the coupling reaction condition is preferably 0.2 to 5 hours, more preferably 0.5 to 3 hours.

The solvent for the metal coupling reaction is not particularly limited and examples thereof include alcohols (favorably, straight- or branched-chain alcohols having 1 to 5 carbon atoms), acetone, and furan. Among the solvents above, methanol, ethanol, propyl alcohol, isopropyl alcohol, and acetone are preferable. These solvents may be used alone or in combination of two or more.

The amount of the solvent used for the metal coupling reaction is preferably 100 to 2000 parts, more preferably 600 to 1200 parts, with respect to 100 parts of boron nitride.

The amount of the metal coupling agent used is not particularly limited and preferably 0.5 to 10 parts, more preferably 1 to 5 parts, with respect to 100 parts of boron nitride.

In the present invention, the metal coupling agent is not particularly limited. As shown in [Examples] below, it was possible to bind an metal element and organic functional groups onto the surface of the spherical boron nitride fine particles using various metal coupling agents and thus in the present invention, a desired metal coupling agent may be used as properly selected.

It is preferable to select a coupling agent that is suited for the resin used. It is possible in this way to obtain a boron nitride powder that is favorably compatible with the resin used in the thermally conductive resin composition.

Examples of the metal coupling agents include metal alkoxides, metal chelates, and metal halides. These metal coupling agents may be used alone or in combination of two or more.

The metal element in the metal coupling agent is not particularly limited and is, for example, one or more selected from Si, Ti, Zr, Ce, Al, Mg, Ge, Ga, and V.

The amount of the metal coupling agent used for treatment is desirably such an amount that the spherical boron nitride after surface treatment preferably has any one of more metal elements of Si, Ti, Zr, Ce, Al, Mg, Ge, Ga, and V in an amount of 0.1 atm % or more and 3.0 atm % or less, as determined by X-Ray photoelectron spectroscopy analysis, in its composition on the fine particles surface of 10 nm.

A treatment amount of the metal element at less than 0.1 atm % may result in insufficient improvement in filling property, and a treatment amount of the metal element at more than 3.0 atm % may result in deterioration in thermal conductivity when used as a filler.

The metal coupling agent is preferably a titanium coupling agent, a silane coupling agent, a zirconium coupling agent, or an aluminum coupling agent from the point of easier availability of the metal coupling agent. These metal coupling agents may be used alone or in combination of two or more.

Examples of the titanium coupling agents include isopropyl triisostearoyl titanate, isopropyl tridodecylbenzenesulfonyl titanate, isopropyl tris(dioctylpyrophosphate) titanate, tetraisopropyl bis(dioctyl phosphite) titanate, tetraoctyl bis(ditridecylphosphite) titanate, tetra(2,2-diallyloxymethyl) bis(ditridecyl)phosphite titanate, bis(dioctylpyrophosphate) oxyacetate titanate, bis(dioctylpyrophosphate) ethylene titanate, isopropyl trioctanoyl titanate, isopropyl dimethacryl isostearoyl titanate, isopropyl isostearoyl diacryl titanate, isopropyl tri(dioctylphosphate) titanate, isopropyl tricumylphenyl titanate, isopropyl tri(N-aminoethyl-aminoethyl) titanate, dicumylphenyloxyacetate titanate, and diisostearoyl ethylene titanate.

Preferable among the compounds above are isopropyl triisostearoyl titanate (metal alkoxide), tetraisopropyl bis(dioctylphosphite) titanate (metal chelate), and tetraoctyl bis(ditridecylphosphite) titanate (metal chelate).

Examples of the silane coupling agents include vinylsilanes such as vinyl trichlorosilane, vinyl tris(ß-methoxyethoxy)silane, vinyl triethoxysilane, and vinyltrimethoxysilane; γ-methacryloxypropyltrimethoxysilane; epoxysilanes such as ß-(3,4-epoxycyclohexyl)ethyltrimethoxysilane, 3-glycidoxypropyltrimethoxysilane, and 3-glycidoxypropylmethyl diethoxysilane; and aminosilanes such as N-ß-(aminoethyl)-γ-aminopropyltrimethoxysilane, N-ß-(aminoethyl)-γ-aminopropylmethyldimethoxysilane, γ-aminopropyltrimethoxysilane, and N-phenyl-γ-aminopropyltrimethoxysilane. Other silane coupling agents include γ-mercaptopropyltrimethoxysilane, γ-chloropropylmethyldimethoxysilane, γ-chloropropylmethyl diethoxysilane, and the like.

Preferable among them are 3-glycidyloxypropyltrimethoxysilane, p-styryltrimethoxysilane (metal alkoxide), 3-isocyanatopropyltriethoxysilane (metal alkoxide), vinyltrimethoxysilane (metal alkoxide), and cyclohexylmethyldimethoxysilane (metal alkoxide).

Examples of the zirconium coupling agents include tetra-n-propoxyzirconium, tetra-butoxyzirconium, zirconium tetraacetylacetonate, zirconium dibutoxybis(acetylacetonate), zirconium tributoxyethylacetoacetate, zirconium butoxyacetylacetonate bis(ethyl acetoacetate), and tetrakis(2,4-pentanedionato)zirconium.

Preferable among them are tetrakis(2,4-pentanedionato) zirconium (metal alkoxide).

Examples of the aluminum coupling agents include aluminum isopropylate, mono-sec-butoxyaluminum diisopropylate, aluminum sec-butyrate, aluminum ethylate, ethyl acetoacetate aluminum diisopropylate, aluminum tris(ethyl acetoacetate), alkyl acetoacetate aluminum diisopropylate, aluminum monoacetylacetonate bis(ethyl acetoacetate), aluminum tris(acetyl acetoacetate), and aluminum bisethyl acetoacetate monoacetylacetonate.

Preferable among them is aluminum bisethyl acetoacetate-monoacetylacetonate (metal chelate compound).

The spherical boron nitride fine powder (the third spherical boron nitride fine powder) obtained by the method for manufacturing a surface-treated spherical boron nitride fine powder according to the present invention is characterized, as described above in <1. Spherical boron nitride fine powder of the present invention>.

<3. Thermally Conductive Resin Composition>

The thermally conductive resin composition according to the present invention is characterized by containing the spherical boron nitride fine powder of the present invention or a spherical boron nitride fine powder obtained by the manufacturing method according to the present invention. The method for manufacturing the thermally conductive resin composition used may be a known preparative method. The thermally conductive resin composition obtained can be used widely, for example, as a heat dissipating part.

It is also preferable to use a spherical boron nitride fine powder according to the present invention higher in compatibility with the resin used as the raw material. As the spherical boron nitride fine powder according to the present invention has organic functional groups present on the particle surface, it is preferable to select and produce a suitable spherical boron nitride fine powder, as the compatibility of the organic functional groups with the raw material resin is taken into consideration.

As the spherical boron nitride fine powder according to the present invention can suppress increase in viscosity during production of the thermally conductive resin composition, it can be applied to high-viscosity raw material resins. As described above, the spherical boron nitride fine powder according to the present invention can be used with a wide variety of raw material resins.

<Resin>

Examples of the resins used in the thermally conductive resin composition containing the spherical boron nitride fine powder according to the present invention include epoxy resins, silicone resins, silicone rubbers, acrylic resins, phenol resins, melamine resins, urea resins, unsaturated polyesters, fluoroplastics, polyamides (for example, polyimides, polyamide-imides, polyether imides), polyesters (for example, polybutylene terephthalate, polyethylene terephthalate), polyphenylene ethers, polyphenylene sulfides, wholly aromatic polyesters, polysulfones, liquid crystalline polymers, polyether sulfones, polycarbonates, maleimide-modified resins, ABS resins, AAS (acrylonitrile-acrylic rubber-styrene) resins, and AES (acrylonitrile-ethylene-propylene-diene rubber-styrene) resins.

In particular, epoxy resins (favorably, bisphenol A-type epoxy resins, naphthalene-type epoxy resins, etc.), which are superior in heat resistance and adhesive strength to copper foil circuits, are favorable as an insulation layer for printed wiring boards.

Silicone resins, which are superior in heat resistance, flexibility, and adhesiveness for example to heat sink, are favorable as a thermal interface material.

Typical examples of the hardener for epoxy resins include phenolic novolak resins, acid anhydride resins, amino resins, and imidazoles. Among the hardeners above, imidazoles are preferable.

The blending amount of the hardener is preferably 0.5 part by mass or more and 15 parts by mass or less, more preferably 1.0 part by mass or more and 10 parts by mass or less.

The amount of the spherical boron nitride fine powder used in 100 vol % of the thermally conductive resin composition is preferably 30 vol % or more and 85 vol % or less, more preferably 40 vol % or more and 80 vol % or less, with respect to the total amount of epoxy resin and hardener.

When the amount of the spherical boron nitride fine powder used is 30 vol % or more, the thermally conductive resin composition has improved thermal conductivity and easily shows sufficiently high heat dissipating performance. When the content of the spherical boron nitride fine powder is 85 vol % or less, it is possible to reduce void generation during molding and thus to reduce deterioration in insulating efficiency and mechanical strength of the molded product.

<Measurement Method>

The spherical boron nitride powders used in the present invention were analyzed by the measurement methods shown below.

(1) Average Particle Diameter:

Average particle diameter was determined by using a laser diffraction/scattering particle size distribution analyzer, (LS-13 320) manufactured by Beckman Coulter. The average particle diameter obtained is the average particle diameter based on volumetric data.

When the average particle diameter was less than 100 nm, a dynamic light scattering analyzer Zetasizer Nano ZS manufactured by MALVERN was used.

(2) Average Circularity:

Particle images were obtained under a scanning electron microscope (SEM) or a transmission electron microscope (TEM) and the projected areas (S) and peripheral lengths (L) of the particles were determined using an image analyzer (for example, trade name: "MacView," manufactured by Mountech). Circularity was calculated according to the following Formula:

$$\text{Average circularity: Circularity} = 4\pi S/L^2$$

The circularity of 100 particles arbitrarily chosen was determined and the average thereof was used as the average circularity of the sample. Microscopic photographs were analyzed by manual recognition mode at a magnification of 10,000 to 100,000 times and an image resolution of 1280× 1024 pixels. The minimum diameter of the particles used in the measurement was 20 nm.

(3) Viscosity Evaluation:

In preparing samples for viscosity measurement, boron nitride powder was added to a raw material resin "epoxy resin jER816A produced by Mitsubishi Chemical Corporation" and the mixture was processed with three-roll mill, to give a test sample. For use as a filler, spherical boron nitride is added in a small amount in combination with a coarse-particle filler and thus, samples were prepared, using a low-viscosity resin at a boron nitride powder loading rate of 5 vol %, and the viscosity of the samples was compared in the low shear rate region.

Viscosity was determined, using a rheometer MCR300 manufactured by Anton-Paar and the viscosity at a shear rate of 0.011/sec was used for evaluation. As filling property is considered to be higher when viscosity is lower, a viscosity value of 20 Pa·sec or less was considered satisfactory.

(4) X-Ray Photoelectron Spectroscopy Analysis:

The amount of metals present on the surface of boron nitride was determined by analyzing treated powder on K-Alpha X-Ray photoelectron spectrometer manufactured by Thermo Fisher under the conditions of an excitation source of Al-X-ray with monochromometer and a measurement region of 400×200 μm.

Semi-quantitative values of detected metal elements were estimated from the integral values of the detected elements B, N, C, O, and respective metals. The values are normally represented by atom number rate (atm %). The X-Ray photoelectron spectrometer had a detection depth of 10 nm from the surface.

(5) Time-of-Flight Secondary Ion Mass Spectrometry (TOF-SIMS):

Functional groups on the surface of boron nitride were analyzed on a time-of-flight secondary ion mass spectrometer PHI nanoTOF II manufactured by ULVAC-PHI, Inc. When the results of mass spectrometry indicate detection of multiple fragment peaks derived from the coupling agent, ○ is shown in the column of Surface functional group and × is shown there when the results show no detection of the fragment peaks.

EXAMPLES

Hereinafter, the present invention will be described in detail with reference to Examples and Comparative Examples, but it should be understood that the invention shall not be limited thereto.

Example 1

A surface-treated spherical boron nitride fine powder of Example 1 was prepared in the first to third calcining steps and a surface-treating step shown below in that order. The spherical boron nitride fine powder obtained was mixed with a resin, to give a thermally conductive resin composition.

(Calcination Condition 1)

A furnace tube was placed in a resistance-heating furnace and heated to a temperature of 1000° C. Trimethyl borate ("TMB-R", produced by Tama Chemicals Co., Ltd.) was introduced into the furnace tube through an injector by nitrogen bubbling, and separately, ammonia gas (purity:

99.9% or more) was also introduced into the furnace tube through an injector. The molar ratio of the trimethyl borate and ammonia introduced was 1:1.2 and they were allowed to react in gas phase in the furnace for a reaction time of 10 seconds, to give a white powder. The white powder generated was collected.

(Calcination Condition 2)

The white powder collected under the calcination condition 1 was packed in a boron nitride crucible, transferred into the resistance-heating furnace and heated there at a temperature of 1350° C. under a mixed atmosphere of nitrogen and ammonia (1:1) for 5 hours. After termination of calcination, the powder was cooled and the calcined product was collected.

(Calcination Condition 3)

The calcined product obtained under the calcination condition 2 was placed in a boron nitride crucible, calcined in the induction-heating furnace under a nitrogen environment at 2000° C. for 4 hours, to give a boron nitride fine powder. The spherical boron nitride powder prepared under the calcination conditions 1 to 3 had an average particle diameter of 0.05 µm or more and 1 µm or less and an average circularity of 0.8 or more.

(Surface Treatment Condition)

The spherical boron nitride powder prepared was subjected to a surface modification treatment, using a rocking mill manufactured by Seiwa Giken Co., Ltd., under a condition of a frequency of 600 rpm and 1400 parts of aqueous hydrogen peroxide (water:hydrogen peroxide=1: 0.05 (wt % ratio) with respect of 100 parts of boron nitride) for 30 minutes.

The medium used was 0.3-mφ zirconia balls. The treated slurry was sieved with a 75-µm sieve for separation of the medium and the sieved slurry was filtered and washed.

1000 parts of isopropyl alcohol and 4 parts of a coupling agent, KR-TTS (isopropyl triisostearoyl titanate) produced by Ajinomoto Fine-Techno Co., Ltd. respectively with respect to 100 parts of boron nitride were added to the wet cake after filtration and the mixture was heated at 70° C. for 3 hours for coupling treatment. The treated powder was filtered, washed and dried at 80° C., to give a surface-treated spherical boron nitride fine powder.

(Mixing with Resin)

The surface-treated spherical boron nitride fine powder obtained was mixed with 100 parts of a naphthalene-type epoxy resin (HP4032 produced by DIC) and 10 parts of a hardener imidazole (2E4 MZ-CN produced by Shikoku Chemical Corporation) at a rate of 50 vol % and the mixture was applied on a PET sheet to a thickness of 1.0 mm and defoamed under a reduced pressure of 500 Pa for 10 minutes. The mixture was then heat-treated under pressure under a condition of a temperature of 150° C. and a pressure of 160 kg/cm² for 60 minutes, to give a 0.5-mm sheet.

Example 2

A surface-treated spherical boron nitride fine powder of Example 2 was prepared under a condition similar to that of Example 1, except that the amount of the coupling agent used under the surface treatment condition was changed to 1 part.

Example 3

A surface-treated spherical boron nitride fine powder of Example 3 was prepared under a condition similar to that of Example 1, except that the amount of the coupling agent used under the surface treatment condition was changed to 30 parts.

Example 4

A surface-treated spherical boron nitride fine powder of Example 4 was prepared under a condition similar to that of Example 1, except that the molar ratio of trimethyl borate to ammonia under the calcination condition 1 was changed to 1:9.

Example 5

A surface-treated spherical boron nitride fine powder of Example 5 was prepared under a condition similar to that of Example 1, except that the heating temperature under the calcination condition 1 was changed to 800° C.

Example 6

A surface-treated spherical boron nitride fine powder of Example 6 was prepared under a condition similar to that of Example 1, except that the temperature under the calcination condition 2 was changed to 1500° C.

Example 7

A surface-treated spherical boron nitride fine powder of Example 7 was prepared under a condition similar to that of Example 1, except that the coupling agent used under the surface treatment condition was changed to KR-46B [tetraoctyl-bis(ditridecylphosphite) titanate] produced by Ajinomoto Fine-Techno Co., Ltd.

Example 8

A surface-treated spherical boron nitride fine powder of Example 8 was prepared under a condition similar to that of Example 1, except that the coupling agent used under the surface treatment condition was changed to X12-982S [polymer-type epoxysilane-based resin] produced by Shin-Etsu Silicones.

Example 9

A surface-treated spherical boron nitride fine powder of Example 9 was prepared under a condition similar to that of Example 1, except that the coupling agent used under the surface treatment condition was changed to [3-glycidyloxypropyltrimethoxysilane] produced by Tokyo Chemical Industry Co., Ltd.

Example 10

A surface-treated spherical boron nitride fine powder of Example 10 was prepared under a condition similar to that of Example 1, except that the coupling agent used under the surface treatment condition was changed to [tetrakis(2,4-pentanedionato)zirconium (IV) (zirconium(IV) acetylacetonate)] produced by Tokyo Chemical Industry Co., Ltd.

Example 11

A surface-treated spherical boron nitride fine powder of Example 11 was prepared under a condition similar to that of Example 1, except that the coupling agent used under the surface treatment condition was changed to Orgatics AL-3200 [aluminum bisethyl acetoacetate monoacetylacetonate (($C_5H_7O_2$) ($C_6H_9O_3)_2$)] produced by Matsumoto Fine Chemical Co., Ltd.

Example 12

A surface-treated spherical boron nitride fine powder of Example 12 was prepared under a condition similar to that of Example 1, except that the coupling agent used under the surface treatment condition was changed to KBM-140 [p-styryltrimethoxysilane] produced by Shin-Etsu Silicones.

Example 13

A surface-treated spherical boron nitride fine powder of Example 13 was prepared under a condition similar to that of Example 1, except that the coupling agent used under the surface treatment condition was changed to KBE-9007 [3-isocyanatopropyltriethoxysilane] produced by Shin-Etsu Silicones.

Example 14

A surface-treated spherical boron nitride fine powder of Example 14 was prepared under a condition similar to that of Example 1, except that the coupling agent used under the surface treatment condition was changed to Z-6300 [vinyltrimethoxysilane] produced by Dow Corning Toray.

Example 15

A surface-treated spherical boron nitride fine powder of Example 15 was prepared under a condition similar to that of Example 1, except that the coupling agent used under the surface treatment condition was changed to Z-6187 [cyclohexylmethyldimethoxysilane] produced by Dow Corning Toray.

Example 16

A surface-treated spherical boron nitride fine powder of Example 16 was prepared under a condition similar to that of Example 1, except that 1400 parts of aqueous hydrogen peroxide (water:hydrogen peroxide=1:0.05 (wt % ratio) was changed to 1400 parts of aqueous nitrous acid (water:nitrous acid=1:0.05 (wt % ratio).

Example 17

A surface-treated spherical boron nitride fine powder of Example 17 was prepared under a condition similar to that of Example 1, except that 1400 parts of aqueous hydrogen peroxide (water:hydrogen peroxide=1:0.05 (wt % ratio) was changed to 1400 parts of aqueous permanganate salt (water:permanganate salt=1:0.03 (wt % ratio).

Comparative Example 1

A boron nitride fine powder of Comparative Example 1 was prepared under a condition similar to that of Example 1, except that the surface modification treatment and the coupling treatment were not performed.

Comparative Example 2

A boron nitride fine powder of Comparative Example 2 was prepared under a condition similar to that of Example 1, except that the rocking mill treatment was not performed as the surface modification treatment during surface treatment.

Comparative Example 3

A boron nitride fine powder of Comparative Example 3 was prepared under a condition similar to that of Example 1, except that no hydrogen peroxide was added during the surface modification treatment.

Comparative Example 4

A boron nitride fine powder of Comparative Example 4 was prepared under a condition similar to that of Example 1, except that the molar ratio of trimethyl borate to ammonia was changed to 1:12.

Comparative Example 5

A boron nitride fine powder of Comparative Example 5 was prepared under a condition similar to that of Example 1, except that the calcination period under the calcination condition 2 was changed to 10 minutes.

Comparative Example 6

A boron nitride fine powder of Comparative Example 6 was prepared under a condition similar to that of Example 7, except that the rocking mill treatment was not performed as the surface modification treatment during surface treatment.

Comparative Example 7

A boron nitride fine powder of Comparative Example 7 was prepared under a condition similar to that of Example 8, except that the rocking mill treatment was not performed as the surface modification treatment during surface treatment.

Comparative Example 8

A boron nitride fine powder of Comparative Example 8 was prepared under a condition similar to that of Example 9, except that the rocking mill treatment was not performed as the surface modification treatment during surface treatment.

Comparative Example 9

A boron nitride fine powder of Comparative Example 9 was prepared under a condition similar to that of Example 10, except that the rocking mill treatment was not performed as the surface modification treatment during surface treatment.

Comparative Example 10

A boron nitride fine powder of Comparative Example 10 was prepared under a condition similar to that of Example 11, except that the rocking mill treatment was not performed as the surface modification treatment during surface treatment.

Measurement results of the spherical boron nitride fine powders of Examples 1 to 17 and the boron nitride fine powders of Comparative Examples 1 to 10 are summarized in Tables 1 to 3.

TABLE 1

|  |  | Example 1 | Example 2 | Example 3 | Example 4 | Example 5 | Example 6 | Example 7 | Example 8 |
|---|---|---|---|---|---|---|---|---|---|
| Spherical BN fine powder | Average particle diameter μm | 0.5 | 0.5 | 0.5 | 0.1 | 1.0 | 0.5 | 0.5 | 0.5 |
|  | Average circularity | 0.9 | 0.9 | 0.9 | 0.9 | 0.9 | 0.8 | 0.9 | 0.9 |
|  | Amount of surface metal atm % | 0.5 | 0.1 | 3 | 0.5 | 0.5 | 0.5 | 0.5 | 0.5 |
|  | Metal element | Ti | Ti | Ti | Ti | Ti | Ti | Ti | Si |
|  | Surface functional group | ○ | ○ | ○ | ○ | ○ | ○ | ○ | ○ |
| Viscosity | Pa · S | 4 | 4 | 6 | 10 | 4 | 5 | 4 | 4 |

TABLE 2

|  |  | Example 9 | Example 10 | Example 11 | Example 12 | Example 13 | Example 14 | Example 15 | Example 16 | Example 17 |
|---|---|---|---|---|---|---|---|---|---|---|
| Spherical BN fine powder | Average particle diameter μm | 0.5 | 0.5 | 0.5 | 0.5 | 0.5 | 0.5 | 0.5 | 0.5 | 0.5 |
|  | Average circularity | 0.9 | 0.9 | 0.9 | 0.9 | 0.9 | 0.9 | 0.9 | 0.9 | 0.9 |
|  | Amount of surface metal atm % | 0.5 | 0.5 | 0.5 | 0.5 | 0.5 | 0.5 | 0.5 | 0.5 | 0.5 |
|  | Metal element | Si | Zr | Al | Si | Si | Si | Si | Ti | Ti |
|  | Surface functional group | ○ | ○ | ○ | ○ | ○ | ○ | ○ | ○ | ○ |
| Viscosity | Pa · S | 4 | 4 | 4 | 5 | 4 | 5 | 4 | 4 | 4 |

TABLE 3

|  |  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|---|---|---|
| BN fine powder | Average particle diameter μm | 0.5 | 0.5 | 0.5 | 0.04 | 0.2 | 0.5 | 0.5 | 0.5 | 0.5 | 0.5 |
|  | Average circularity | 0.9 | 0.9 | 0.9 | 0.9 | 0.4 (scaly shape) | 0.9 | 0.9 | 0.9 | 0.9 | 0.9 |
|  | Amount of surface metal atm % | Lower than detection limit | Lower than detection limit | 0.05 | 0.1 | 0.5 | Lower than detection limit | Lower than detection limit | Lower than detection limit | Lower than detection limit | Lower than detection limit |
|  | Metal element | — | — | Ti | Ti | Ti | — | — | — | — | — |
|  | Surface functional group | x | x | ○ | ○ | ○ | x | x | x | x | x |
| Viscosity | Pa · S | 200 | 180 | 50 | 80 | 130 | 180 | 190 | 180 | 190 | 180 |

The viscosities of the spherical BN fine powders of Examples 1 to 17 were approximately 10 Pa·s or less. Most of the viscosities of the BN fine powders of Comparative Examples 1 to 10 were in the vicinity of 190 Pa·s and the BN fine powder of Comparative Example 3 had the lowest viscosity of 50 Pa·s. The viscosities of the spherical BN fine powders of Examples 1 to 17 were at least ⅕ to 1/10, as compared with the viscosity of the powder of Comparative Example 3, which was the lowest in Comparative Examples.

As described above, the spherical BN fine powders of the present invention have a viscosity extremely, distinctively lower than that of traditional products and are thus they are new powders having very excellent filling property. The spherical BN fine powders of the present invention showed favorable filling property into resin, even when they have various organic functional groups present on the surfaces. When an oxidizer such as hydrogen peroxide, nitric acid, or permanganic acid, was used during surface treatment, the resulting powders showed favorable filling property into resin. The spherical BN fine powder improved in filling property according to the present invention can be obtained by the special surface treatment of the present invention. It is possible to provide an excellent thermally conductive resin composition by using the spherical boron nitride fine powder according to the present invention.

INDUSTRIAL APPLICABILITY

The surface-treated spherical boron nitride fine powder according to the present invention can be used widely, for example as a heat-dissipating part.

The present technology may include the following aspects [1] to [10].

[1] A method for manufacturing a surface-treated spherical boron nitride fine powder, characterized by adding an oxidizer to a raw material, spherical boron nitride fine powder having an average particle diameter of 0.05 μm or more and 1 μm or less and an average circularity of 0.8 or more, allowing surface modification treatment of the particles by wet pulverization or wet crushing of the mixture and allowing additional reaction of the surface-modified powder with a metal coupling agent.

[2] The method for manufacturing a surface-treated spherical boron nitride fine powder according to [1] above, wherein an oxidizer and a water-soluble solvent are added during the surface modification treatment.

[3] The method for manufacturing a surface-treated spherical boron nitride fine powder according to [1] or [2] above, wherein the metal coupling agent is one or more selected from metal alkoxides having organic functional groups, metal chelates having organic functional groups, and metal halogen compounds having organic functional groups.

[4] The method for manufacturing a surface-treated spherical boron nitride fine powder according to any one of [1] to [3] above, wherein the metal coupling agent is one or more selected from titanium coupling agents, silane coupling agents, zirconium coupling agents, and aluminum coupling agents.

[5] A thermally conductive resin composition, comprising the spherical boron nitride fine powder according to the present invention or a spherical boron nitride fine powder prepared by the manufacturing method according to any one of [1] to [4] above.

[6] A method for manufacturing a surface-modified spherical boron nitride fine powder, characterized by adding an oxidizer to a raw material, a spherical boron nitride fine powder having an average particle diameter of 0.05 μm or more and 1 μm or less and an average circularity of 0.8 or more and allowing surface modification treatment of the particles by wet pulverization or wet crushing of the mixture.

[7] A surface-modified spherical boron nitride fine powder prepared by the method for manufacturing a surface-modified spherical boron nitride fine powder according to [6] above.

[8] A method for manufacturing a surface-treated spherical boron nitride fine powder, comprising allowing additional reaction of the surface-modified spherical boron nitride fine powder according to [7] with a metal coupling agent.

[9] A surface-treated spherical boron nitride fine powder, prepared by the manufacturing method according to any one of [1] to [4] above, having the following characteristics (A) to (C):
(A) the spherical boron nitride fine particles have any one or more of Si, Ti, Zr, Ce, Al, Mg, Ge, Ga, and V in an amount of 0.1 atm % or more and 3.0 atm % or less in its composition on the surface of 10 nm;
(B) the spherical boron nitride fine powder has an average particle diameter of 0.05 μm or more and 1 μm or less; and
(C) the spherical boron nitride fine powder has an average circularity of 0.8 or more. The surface-treated spherical boron nitride fine powder above may additionally have a following characteristic (D): (D) the spherical boron nitride fine particles have an organic functional group on the surface.

[10] A pretreatment method of the spherical boron nitride fine powder or a surface treatment method of spherical boron nitride fine powder before metal coupling reaction, characterized by adding an oxidizer to a raw material, spherical boron nitride fine powder and allowing surface modification treatment of the particles by wet pulverization or wet crushing of the mixture before the metal coupling reaction.

The invention claimed is:

1. A spherical boron nitride fine powder, having the following characteristics (A) to (C):
   (A) the spherical boron nitride fine particles have at least one element selected from the group consisting of Si, Ti, Zr, Ce, Al, Mg, Ge, Ga, or V wherein an amount of the at least one element in a depth of 10 nm from a surface of the spherical boron nitride fine particles is 0.1 atm % or more and 3.0 atm % or less;
   (B) the spherical boron nitride fine powder has an average particle diameter of 0.05 μm or more and 1 μm or less; and
   (C) the spherical boron nitride fine powder has an average circularity of 0.8 or more.

2. The spherical boron nitride fine powder according to claim 1, further having another characteristic (D):
   (D) the spherical boron nitride fine particles have an organic functional group on the surface.

3. The spherical boron nitride fine powder according to claim 2, wherein the organic functional group present on the surface of the spherical boron nitride fine particles is one or more selected from epoxy groups, styryl groups, a methacryloxypropyl group, an acryloxypropyl group, an aminoethylaminopropyl group, glycidoxypropyl group, a phenylaminopropyl group, an acetylacetonate group, vinyl groups, methacryl groups, methacryloyl groups, an isopropyltriisostearoyl group, a tetraoctyl bis (ditridecyl phosphite) group, a cyclohexyl group, an isocyanate group, and alkyl groups having a straight-chain carbon number of 5 or more.

4. The spherical boron nitride fine powder according to claim 1, prepared by mixing a raw material spherical boron nitride fine powder having an average particle diameter of 0.05 μm or more and 1 μm or less and an average circularity of 0.8 or more with an oxidizer, allowing surface modification treatment of the particles by wet pulverization or wet crushing of the mixture and allowing additional reaction of the surface-modified powder with a metal coupling agent.

5. The spherical boron nitride fine powder according to claim 4, prepared by adding the oxidizer and a water-soluble solvent during the surface modification treatment.

6. The spherical boron nitride fine powder according to claim 4, wherein the metal coupling agent is one or more selected from titanium coupling agents, silane coupling agents, zirconium coupling agents, and aluminum coupling agents.

7. The spherical boron nitride fine powder according to claim 1, wherein the at least one element is selected from the group consisting of Ti, Zr or Al.

8. The spherical boron nitride fine powder according to claim 1, wherein the spherical boron nitride fine powder is a spherical boron nitride fine powder oxidized and reacted with metal coupling agent.

9. A thermally conductive resin composition, comprising the spherical boron nitride fine powder according to claim 1.

* * * * *